Nov. 29, 1932.  L. V. HASS  1,889,656
CONTROL DEVICE FOR MOTOR VEHICLES
Filed March 28, 1932
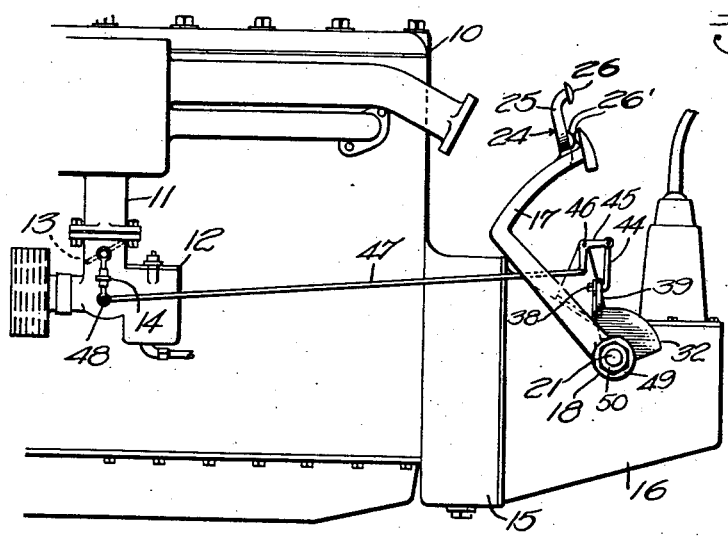
*Fig. 1.*
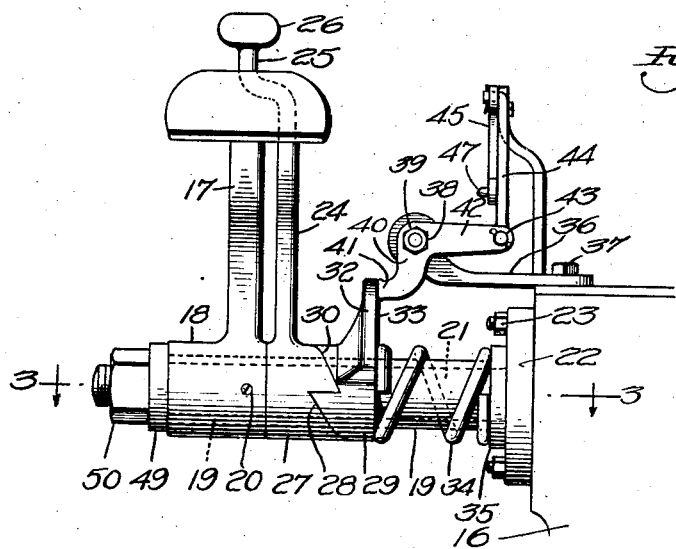
*Fig. 2.*
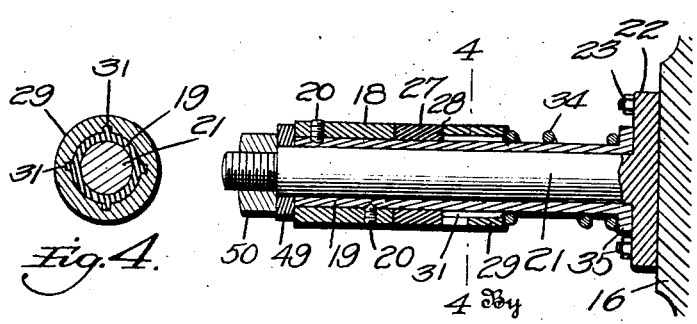
*Fig. 3.*
*Fig. 4.*
Inventor
LEWIS V. HASS
Attorney Patented Nov. 29, 1932

1,889,656

UNITED STATES PATENT OFFICE

LEWIS V. HASS, OF CHARITON, IOWA

CONTROL DEVICE FOR MOTOR VEHICLES

Application filed March 28, 1932. Serial No. 601,703.

This invention relates to control devices for motor vehicles.

As is well known, an automobile is provided with three essential controls operable by the feet of the operator, namely, the clutch, brake and accelerator. Accordingly it is impossible for the operator to operate all of the control mechanisms simultaneously. For example, when starting a vehicle upwardly on a hill, it is necessary for the clutch to be disengaged, while the brake is operated to prevent the vehicle from moving rearwardly, and prior to operation of the accelerator pedal, it is necessary for the operator to release the brake, and thus operation of the vehicle is rendered difficult.

An important object of the present invention is to provide novel means whereby the operator of a motor vehicle is enabled to simultaneously retain under control the clutch, brake and accelerator of a motor vehicle.

A further object is to provide novel control means having the throttle of the engine associated with either the clutch or brake pedal of the vehicle to permit its operation wholly independently thereof.

A further object is to provide an accelerator pedal associated with either the brake or clutch pedal and movable simultaneously therewith without effecting movement of the throttle, and to provide means whereby movement of the foot of the operator is adapted to effect independent movement of the accelerator.

A further object is to provide a novel control mechanism for a motor vehicle which greatly increases the facility of the driver in controlling the vehicle particularly with respect to controlling the clutch and throttle when the vehicle is on a hill to place the vehicle in motion simultaneously with the releasing of the brake to prevent the vehicle from rolling down hill.

Other objects and advantages of the invention will become apparent during the course of the following description.

In the drawing I have shown one embodiment of the invention. In this showing,

Figure 1 is a side elevation of a portion of a motor vehicle engine and associated elements showing the invention applied, Figure 2 is an enlarged rear elevation of the device in operative position, Figure 3 is a section on line 3—3 of Figure 2, and, Figure 4 is a transverse section on line 4—4 of Figure 3.

Referring to Figure 1, the numeral 10 designates the motor vehicle engine having the usual intake manifold 11 and carbureter 12. The supply of combustible mixture to the engine is controlled by a throttle 13 operated by a depending arm 14. A clutch housing 15 and a gear set 16 are arranged rearwardly of the engine and contain the usual clutch and change speed gear elements (not shown). The elements described are conventional, and form no part of the present invention.

As is well known, a motor vehicle is provided with a clutch pedal and a brake pedal, and one of such pedals is shown in the drawing and designated by the numeral 17. It will be apparent that this pedal may be either the clutch or brake pedal, but is preferably the brake pedal for the reason that this pedal and the accelerator are conveniently controlled by the right foot of the operator. The pedal 17 is provided at its lower end with a hub 18 surrounding a sleeve 19 and secured against movement with respect thereto by set screws 20. The sleeve 19, in turn, surrounds a shaft 21 which may have a plate or flange 22 at one end secured by bolts 23 to the gear housing or to any other relatively stationary part of the vehicle to form a support therefor. The form of the invention shown in the drawing is merely illustrative and this is particularly true of the shaft 21. As is well known, the brake and clutch pedals usually are rotatable about a common axis which is the axis of the clutch operating shaft, and accordingly the shaft 21 may be the clutch shaft.

An accelerator pedal 24 is arranged substantially parallel throughout the greater portion of its length to the shank of the pedal 17, and has its upper end preferably offset as at 25 and provided with a button portion 26 at its upper end lying just above the tread of the pedal 17. The pedals 17 and 24 are provided with contact elements 26' whereby depression of the pedal causes corresponding depression of the pedal 24. It will be apparent, however, that when the driver rests the ball of the foot upon the pedal 17, a forward rocking motion of the foot will actuate the accelerator pedal to cause movement thereof independently of the pedal 17. In this connection it will be noted that the pedal 24 is provided with a hub 27 rotatably surrounding the sleeve 19. The hub 27 is provided at its inner end with cam teeth 28 for a purpose to be described.

A hub 29 surrounds the sleeve 19 inwardly of the hub 27. The hub 29 is provided with cam teeth 30 similar to and engaging the teeth 28. The hub 29 is splined to the sleeve 19 as at 31. Accordingly it will be apparent that the hub 29 is fixed against relative rotation with respect to the sleeve 19 but is adapted to slide longitudinally therealong. A substantially arcuate operating plate 32 is formed integral with the hub 29 and is provided with an inner face 33 lying in a plane at right angles to the axis of the sleeve 19. Accordingly it will be apparent that when the hub 29 rotates as a unit with the sleeve 19 the face 33 remains in the same plane, but moves longitudinally with respect to the sleeve upon sliding movement of the hub 29. A compression coil spring 34 surrounds the inner end of the sleeve 19 and has its ends contacting respectively with the hub 29 and with a flange 35 formed on the inner end of the sleeve 19. This spring obviously urges the hub 29 toward the hub 27 to maintain the two sets of cam teeth in engagement with each other.

Means are provided for transmitting longitudinal movement of the hub 29 to the operating arm 14 of the accelerator. Any means may be provided for this purpose, and accordingly it is to be understood that the means disclosed in the drawing is merely illustrative. A bracket 36 is secured by a bolt 37 to the gear housing 16 or any other suitable relatively stationary part of the vehicle. The end of this bracket carries a bolt 38 by means of which a bell crank lever 39 is pivotally connected to the bracket. The bell crank lever has one end 40 extending inwardly toward the sleeve 19 and then longitudinally to provide a contact end 41 arranged against the face 33.

The other end 42 of the bell crank lever is pivotally connected as at 43 to a rod 44. The upper end of the rod 44 is connected to one arm of a bell crank lever 45 pivotally supported as at 46 by any suitable means. The other arm of the bell crank lever is connected to one end of a rod 47, and the opposite end of this rod is pivotally connected to the lower end of the throttle arm 14 as at 48. While I have described the rods 44 and 47 and bell crank lever 45 as forming the means for transmitting motion to the throttle arm 14, it will be apparent that the invention is not limited in any sense to the particular means referred to, and that any desired means may be employed for this purpose.

As previously stated, the installation of the device may follow conventional practice in so far as the shaft 21 is concerned. In other words, this shaft may be the clutch shaft and may project beyond the pedal 17 to carry the clutch shaft in the usual manner. For the purpose of illustration, however, only one pedal has been illustrated, namely, the brake pedal, and this pedal is positively held against displacement from the shaft 21 by a washer 49, and a nut 50 threaded on the reduced outer end of the shaft 21. The screws 20 serve to positively prevent rotation of the hub 18 with respect to the sleeve 19 and also would prevent longitudinal movement of the hub 18, but it is preferred to employ positive means for preventing such longitudinal movement, such for example, as the nut 50.

The operation of the device is as follows:

The entire operation of the vehicle may be accomplished with one of the feet of the operator resting upon the tread of the pedal 17. As previously stated, this pedal may be either the clutch or brake pedal of the vehicle. Such a pedal constitutes a "control member" of the vehicle, and wherever this expression occurs in the following claims it is understood that it is intended to include the end of the clutch or brake operating means. In practice, however, it is preferred that the accelerator pedal be arranged adjacent the brake pedal because of the habit of operators, in accordance with present conventional automobile constructions, to operate the accelerator pedal with the right foot.

So far as the clutch and brake are concerned, the vehicle is operated conventionally, the clutch pedal being depressed in accordance with the usual practice when changing gears and when the vehicle is brought to a stop while the brake is actuated when deceleration is desired. Operation of the brake pedal, assuming that the pedal 17 is the brake pedal, takes place through the exercise of pressure exerted by the ball of the foot of the operator without rocking the foot forwardly and actuating the button 26. Under such conditions, brake actuation will take place, but there will be no actuation of the throttle for the reason that the hubs 18 and 27 will rotate as a unit with the sleeve 19.

Assuming that it is desired to operate the accelerator, the foot of the operator will be rocked forwardly over the pedal 17 which will press the button 26 forwardly relatively with respect to the pedal 17. This action will take place regardless of whether the pedal 17 is operated, and accordingly relative rotating movement will take place between the hubs 18 and 27. The hub 29 is fixed against rotation with respect to the sleeve 19 and accordingly remains stationary, so far as rotation is concerned, when the pedal 17 is not operated. Relative movement of the accelerator pedal with respect to the sleeve 19 causes relative rotating movement between the hubs 27 and 29 whereupon the cam teeth 28 and 30 operate to transmit sliding movement to the hub 29. This movement causes the face 33 to transmit movement to the bell crank lever 39, and accordingly the throttle will be actuated through the connections between the bell crank lever and the arm 14.

As previously stated, depression of the pedal 17, without effecting relative movement of the accelerator pedal 24, operates to apply the brakes without operating the throttle. As also previously stated, the accelerator is subject to operation independently of the brake by rocking the foot forwardly to depress the button 26. Obviously, both pedals 17 and 24 may be simultaneously operated when desired, and this is particularly important when the vehicle is about to be started up hill. Under such conditions, the operator may hold the vehicle against rearward movement by holding down the brake pedal 17 without transmitting movement to the button 26. When the operator is ready to start the vehicle moving, the vehicle is placed in gear in the usual manner whereupon the foot of the operator, while still holding down the brake pedal, may rock forwardly to depress the button 26, thus increasing the speed of the engine. At such time, the clutch pedal may be released in accordance with standard practice, and as the clutch elements come into engagement, the operator may gradually release the pedal 17 while still holding the accelerator pedal in a depressed position with respect to the pedal 17, and accordingly it will be apparent that the brake may be released as the vehicle starts to move forwardly. This operation eliminates the necessity of the driver having to quickly transfer his foot from the brake pedal to the usual accelerator pedal.

It will be apparent that the pedal 24 must be permitted to partake of a substantial rotating movement when moved with the brake pedal or when it is moved independently thereof. Accordingly the plate 32 is substantially segmental and of material size, and accordingly is adapted to move throughout its limit of movement without passing beyond contact with the end 41 of the bell crank lever 39.

From the foregoing it will be apparent that the three control elements comprising the clutch, brake and throttle may be controlled in any desired manner by the two feet of the operator without the necessity of transferring either foot from one position to another. It also will be apparent that the accelerator pedal may be associated with either the clutch or brake and is adapted to operate independently of the pedal with which it is associated, or simultaneously therewith.

It is to be understood that the form of the invention herewith shown and described is to be taken as the preferred example of the same and that various changes in the shape, size and arrangement of parts may be resorted to without departing from the spirit of the invention or the scope of the subjoined claims.

I claim:

1. The combination with a pivoted control member of a motor vehicle, of an accelerator pedal pivoted to swing about the pivot axis of the control member, operating means for the throttle of the vehicle engine, and means for transmitting movement to said operating means upon movement of the accelerator pedal about its pivot axis independently of the control member, said last named means being inoperative upon simultaneous swinging movement of said accelerator pedal and control member about their pivot axis.

2. The combination with a pivoted control member of a motor vehicle, of an accelerator pedal pivoted to swing about the pivot axis of the control member, a member longitudinally movable with respect to said pivot axis, means for transmitting longitudinal movement of said last named member to the throttle of the vehicle engine, and means operative upon movement of the accelerator pedal independently of the control member for effecting longitudinal movement of said second named member, said last named means being inoperative upon simultaneous swinging movement of said accelerator pedal and control member about their pivot axis.

3. The combination with a pivoted control member of a motor vehicle, of an accelerator pedal pivoted to swing about the pivot axis of the control member, operating means for the throttle of the vehicle engine, and a cam device operative for transmitting movement to said operating means upon pivoting movement of the accelerator pedal about its pivot axis relative to the control member, said last named means being inoperative upon simultaneous swinging movement of said accelerator pedal and control member about their pivot axis.

4. The combination with a pivoted control member of a motor vehicle, of an accelerator pedal pivoted to swing about the pivot axis of the control member, an actuating member longitudinally movable with respect to said pivot axis, means for transmitting longitudinal movement of said actuating member to the throttle of the vehicle engine, coacting cam means between said accelerator pedal and said actuating member for effecting longitudinal movement of the latter upon relative pivoting movement of said accelerator pedal with respect to said control member, said cam means being inoperative during identical pivoting movement of said control member and said accelerator pedal.

5. The combination with a pivoted control member of a motor vehicle, of a rotatable member adapted to turn with the control member about its pivot axis, an accelerator pedal arranged adjacent said control member and mounted to swing about said pivot axis, means for operating the throttle of the vehicle engine, an actuating member longitudinally movable with respect to said rotatable member and operative for transmitting movement to the throttle through said operating means, and means for effecting longitudinal movement of said actuating member upon relative turning movement of said accelerator pedal with respect to said control member.

6. The combination set forth in claim 5 wherein said actuating member is arranged coaxial with said pivot axis, the means for effecting longitudinal movement of said actuating member comprising coacting cam means between said accelerator pedal and said actuating member.

7. The combination with a pivoted control member of a motor vehicle, a hub for said control member, and a supporting shaft for said hub, of a sleeve rotatable on said shaft and having said hub fixed thereto, an actuating member longitudinally movable on said sleeve and fixed against rotation with respect thereto, means for transmitting longitudinal movement from said actuating member to the throttle of the motor vehicle engine, an accelerator pedal mounted to rotate about the axis of said shaft, and means operative upon relative rotation of said accelerator pedal with respect to the control member for effecting longitudinal movement of said actuating member, said last named means being inoperative during identical simultaneous movement of said accelerator pedal and the control member.

8. The combination with a pivoted control member of a motor vehicle, a hub for said control member, and a supporting shaft for said hub, of a sleeve rotatable on said shaft and having said hub fixed thereto, an actuating member longitudinally movable on said sleeve and fixed against rotation with respect thereto, means for transmitting longitudinal movement from said actuating member to the throttle of the motor vehicle engine, an accelerator having a hub rotatably surrounding said sleeve and provided with a portion contacting with a portion of the control member to be actuated thereby, said accelerator pedal being free to partake of turning movement about said sleeve in advance and independently of the control member, and means operative upon relative movement of said accelerator pedal with respect to and in advance of the control member for effecting longitudinal movement of said actuating member.

9. The combination set forth in claim 8 wherein said actuating member surrounds said sleeve and is splined thereto, and is arranged in end to end relation with the hub of said accelerator, the means for effecting longitudinal movement of said actuating member comprising coacting cam means carried by the adjacent ends of said actuating member and the hub of said accelerator.

10. The combination with a pivoted control member of a motor vehicle, a hub for said control member, and a supporting shaft for said hub, of a sleeve rotatable on said shaft and having said hub fixed thereto, an actuating member splined to said sleeve, an arcuate concentric plate carried by said actuating member, a lever pivotally supported intermediate its ends and having one end engaging said plate to be actuated thereby upon longitudinal movement of said actuating member, means for transmitting movement of the other end of said lever to the throttle of the vehicle engine, an accelerator pedal arranged adjacent said control member and provided with a hub rotatably surrounding said sleeve in end to end relation with said actuating member, said accelerator pedal having a portion contacting with the control member whereby the accelerator pedal is actuated thereby, said accelerator pedal being free to partake of turning movement about said sleeve in advance and independently of the control member, and means operative upon relative movement of said accelerator pedal with respect to and in advance of the control member for effecting longitudinal movement of said actuating member, said last named means including coacting cams carried by the adjacent ends of said actuating member and the hub of said accelerator pedal.

11. A device of the character described comprising an accelerator pedal mounted to turn about the pivot axis of a control member of a motor vehicle, operating means for the throttle of the vehicle engine and means for transmitting movement to said operating means upon turning movement of the accelerator pedal about its pivot axis independently and in advance of the control member, said last named means being inoperative upon identical and simultaneous swinging movement of said accelerator pedal and said control member about their pivot axis.

12. A device of the character described comprising an accelerator pedal mounted to turn about the pivot axis of a control member of a motor vehicle, a member mounted for longitudinal movement with respect to said pivot axis, means for transmitting longitudinal movement of said last named member to the throttle of the vehicle engine, and means operative upon movement of the accelerator pedal independently and in advance of the control member for effecting longitudinal movement of said second named member said last named means being inoperative upon identical and simultaneous swinging movement of said accelerator pedal and control member about their pivot axis.

13. A device of the character described comprising an accelerator pedal pivoted to swing about the pivot axis of a control member of a motor vehicle, operating means for the throttle of the vehicle engine, and a cam device operative for transmitting movement to said operating means upon swinging movement of the accelerator pedal about said pivot axis independently and in advance of the control member, said last named means being inoperative upon identical and simultaneous swinging movement of said accelerator pedal and the control member about said pivot axis.

14. A device of the character described comprising an accelerator pedal pivoted to swing about the pivot axis of a control member of a motor vehicle, an actuating member longitudinally movable with respect to said pivot axis, means for transmitting longitudinal movement of said actuating member to the throttle of the vehicle engine, coacting cam means between said accelerator pedal and said actuating member for effecting longitudinal movement of the latter upon relative pivoting movement of said accelerator pedal with respect to and in advance of said control member, said cam means being inoperative during identical and simultaneous pivoting movement of said control member and said accelerator pedal.

15. A device of the character described comprising a rotatable sleeve supporting a control member of a motor vehicle, an actuating member longitudinally movable on said sleeve and fixed against rotation with respect thereto, means for transmitting longitudinal movement from said actuating member to the throttle of the vehicle engine, an accelerator pedal mounted to rotate about the axis of said sleeve, said accelerator pedal having a portion contacting with the control member whereby said accelerator pedal is moved about the axis of said sleeve upon actuation of the control member, and means operative upon relative rotation of said accelerator pedal with respect to and in advance of the control member for effecting longitudinal movement of said actuating member, said last named means being inoperative during identical and simultaneous movement of the control member and said accelerator pedal.

16. A device of the character described comprising a sleeve rotatable on the supporting shaft of a control member of a motor vehicle and fixed to the control member, an actuating member longitudinally movable on said sleeve and fixed against rotation with respect thereto, means for transmitting longitudinal movement from said actuating member to the throttle of the motor vehicle engine, an accelerator having a hub rotatably surrounding said sleeve and having a portion contacting with a portion of the control member to be actuated thereby, said accelerator pedal being free to partake of turning movement about said sleeve independently and in advance of the control member, and means operative upon relative movement of said accelerator with respect to and in advance of the control member for effecting longitudinal movement of said actuating member.

17. Apparatus constructed in accordance with claim 16 wherein said actuating member surrounds said sleeve and is splined thereto, and is arranged in end to end relation with the hub of said accelerator, the means for effecting longitudinal movement of said actuating member comprising coacting cams formed on the adjacent ends of said actuating member and the hub of said accelerator, and spring means for maintaining said cams in engagement with each other.

18. A device of the character described comprising a sleeve rotatable on the supporting shaft of a control member of a motor vehicle and fixed to the control member, an actuating member splined to said sleeve, an arcuate concentric plate carried by said actuating member, a lever pivotally supported intermediate its ends and having one end engaging said plate to be actuated thereby upon longitudinal movement of said actuating member, means for transmitting movement of the other end of said lever to the throttle of the vehicle engine, an accelerator pedal arranged adjacent said control member and provided with a hub rotatably surrounding said sleeve in end to end relation with said actuating member, said accelerator pedal having a portion contacting with the control member whereby the accelerator pedal is actuated thereby, said accelerator pedal being free to partake of turning movement about said sleeve independently and in advance of the control member, and means operative upon relative movement of said accelerator pedal with respect to and in advance of the control member for effecting longitudinal movement of said actuating member, said last named means including coacting cams carried by the adjacent ends of said actuating member and the hub of said accelerator pedal, and spring means for maintaining said cam in engagement with each other.

In testimony whereof I affix my signature.

LEWIS V. HASS.